Aug. 11, 1936.  K. P. ROLSTON  2,050,861
TEAR GAS BILLY
Filed Nov. 23, 1934  7 Sheets-Sheet 1

INVENTOR
Kenneth P. Rolston
by Christy and Wharton
his attorneys

Aug. 11, 1936.　　K. P. ROLSTON　　2,050,861
TEAR GAS BILLY
Filed Nov. 23, 1934　　7 Sheets-Sheet 3
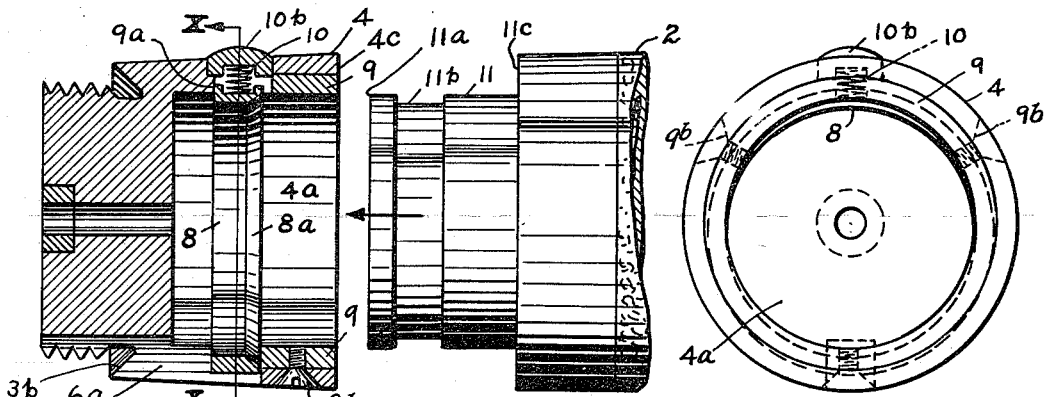
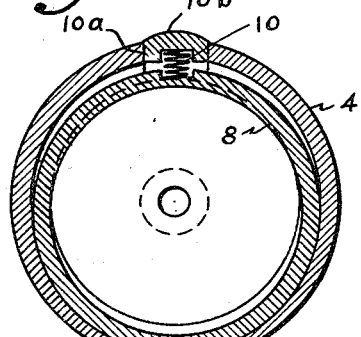
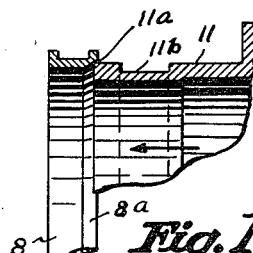
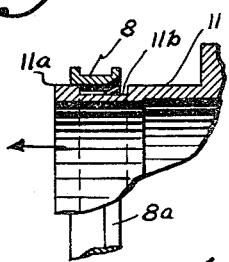
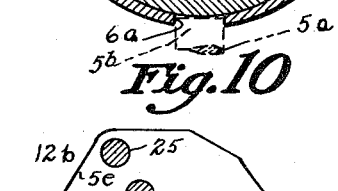
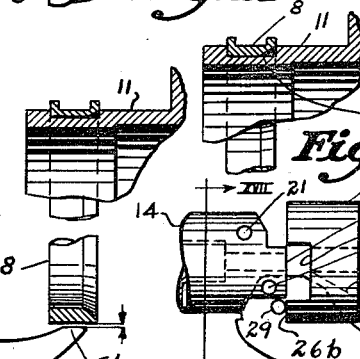
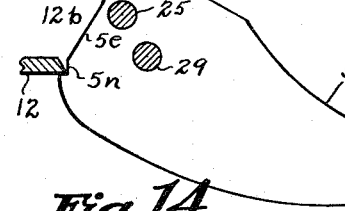
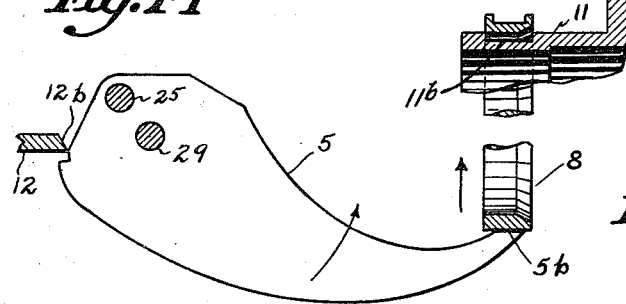
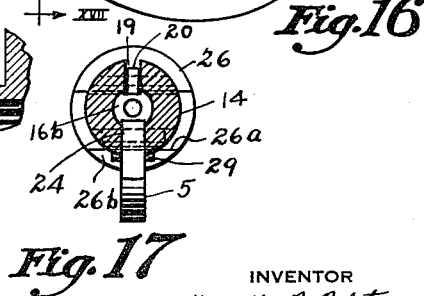
INVENTOR
Kenneth P. Rolston
by Christy and Wharton
his attorneys Aug. 11, 1936.  K. P. ROLSTON  2,050,861
TEAR GAS BILLY
Filed Nov. 23, 1934  7 Sheets-Sheet 4

INVENTOR
Kenneth P. Rolston
by Christy and Wharton
his attorneys

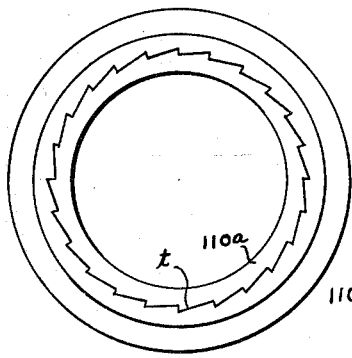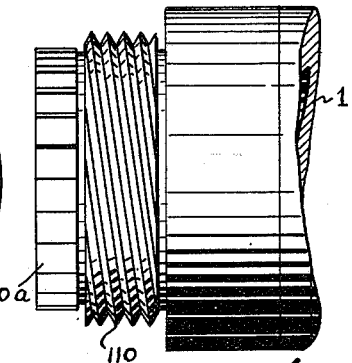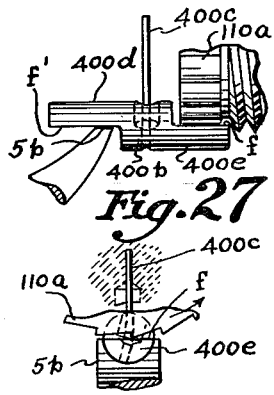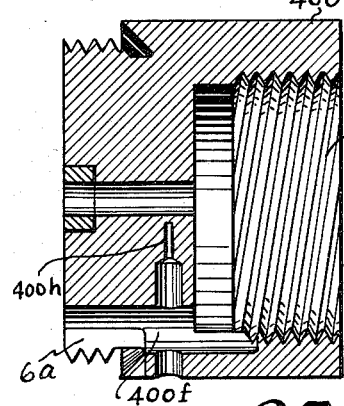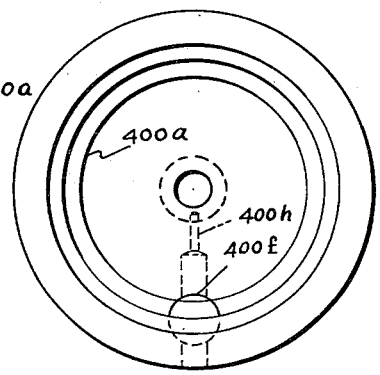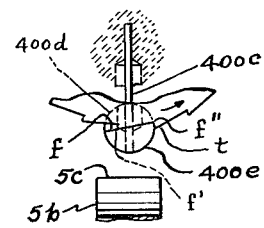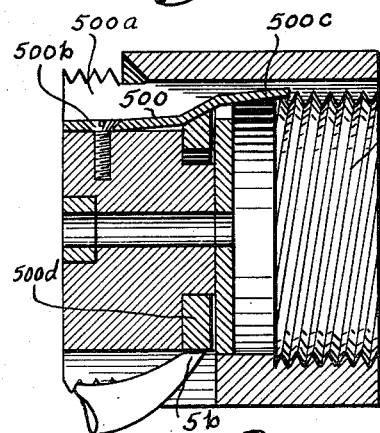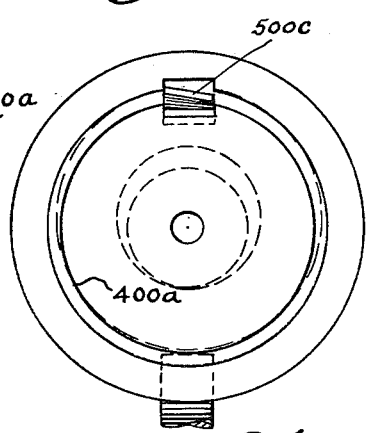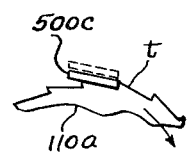

Aug. 11, 1936.　　　K. P. ROLSTON　　　2,050,861
TEAR GAS BILLY
Filed Nov. 23, 1934　　　7 Sheets-Sheet 6

INVENTOR
Kenneth P. Rolston
by Christy and Wharton
his attorneys

Patented Aug. 11, 1936

2,050,861

UNITED STATES PATENT OFFICE 2,050,861

TEAR-GAS BILLY

Kenneth P. Rolston, Pittsburgh, Pa., assignor to Screw Machine Specialty Company, a corporation of Delaware Application November 23, 1934, Serial No. 754,497

22 Claims. (Cl. 42—1)

My invention relates to firearms, and more particularly to so-called chemical firearms, firearms which discharge flares, tear-gas, sickening gas, and the like. Essentially a weapon of this sort comprises a barrel, and mechanism for firing a cartridge in the barrel. The structure of the invention is particularly adapted for tear-gas billies, and in such embodiment I shall describe it.

In a tear-gas billy or bludgeon, the club portion or head of the weapon is hollow and provides the firing barrel. The handle of the billy includes the cartridge-firing mechanism, and the barrel is movable relatively to the handle, to admit of breech-loading.

The object of my invention is to provide improved firing mechanism—mechanism which is controlled by a trigger, and which is particularly effective for operation in a narrow and relatively elongate chamber within the handle of a tear-gas billy.

A further object is to provide a firing mechanism which is economical to construct, and which may be readily assembled in the body of the billy. And I seek to provide a mechanism which is sturdy, and durable in service, and which is adequately safeguarded against accidental discharging operation.

In the several types of tear-gas billies now in common use, I have found that it is possible for an adversary of the user to grasp the head of the billy and to remove the barrel portion from the handle, whereby the weapon is rendered ineffective. A further object of my invention is to provide a tear-gas billy which in hand-to-hand encounter may be readily retained under the control of the user. Still other objects will be apparent in the ensuing specification.

Figures 1, 2:
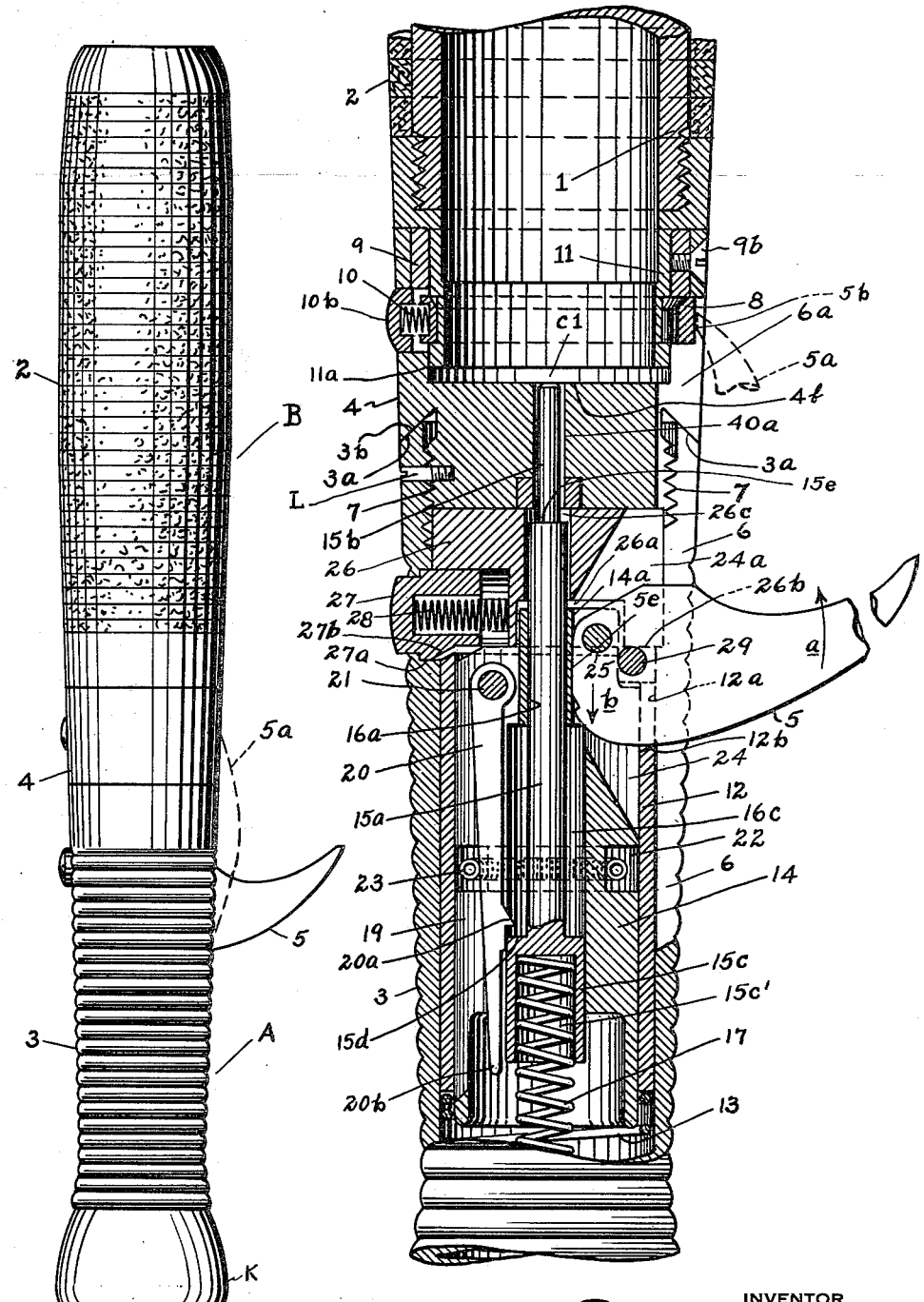
Figure 18:
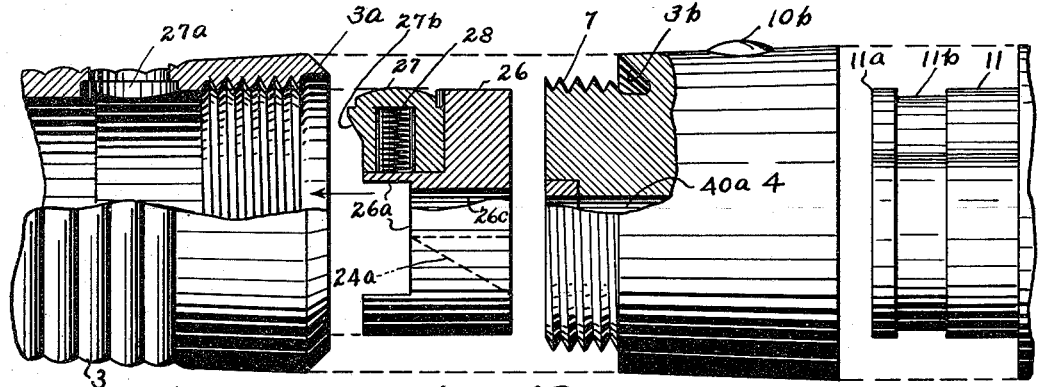
Figures 19, 20:
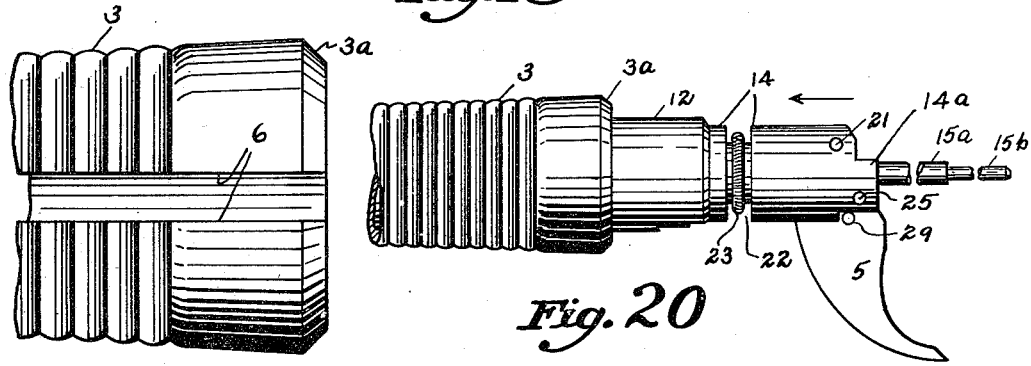
Figure 21:
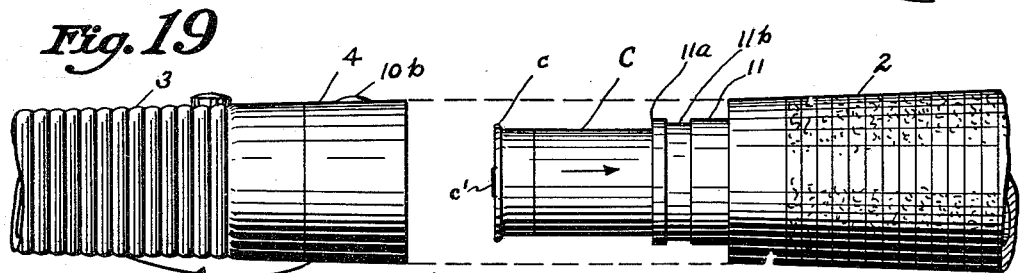
Figure 22:
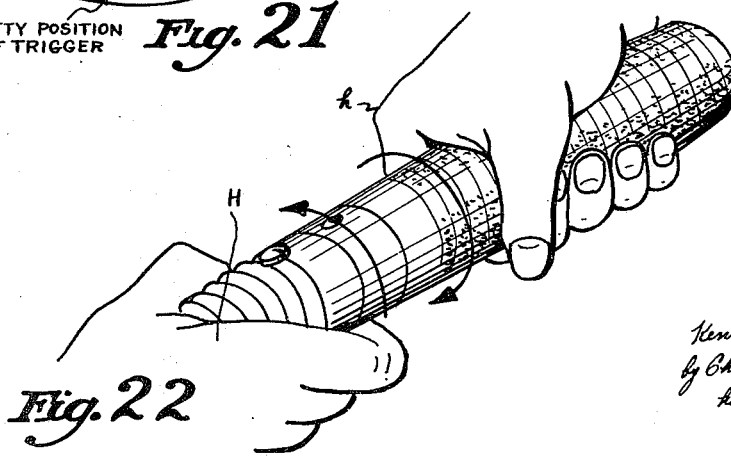
Figure 33:
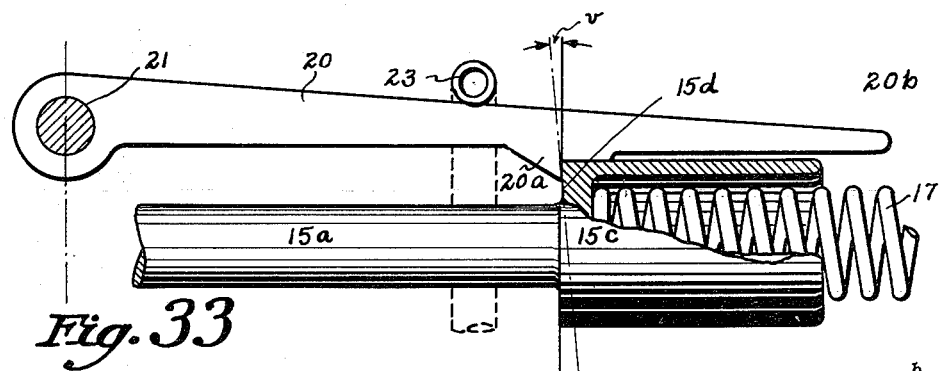
Figure 34:
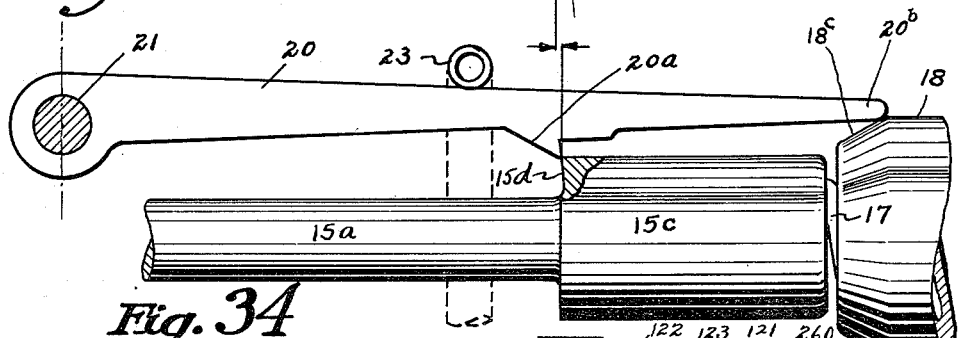
Figure 35:
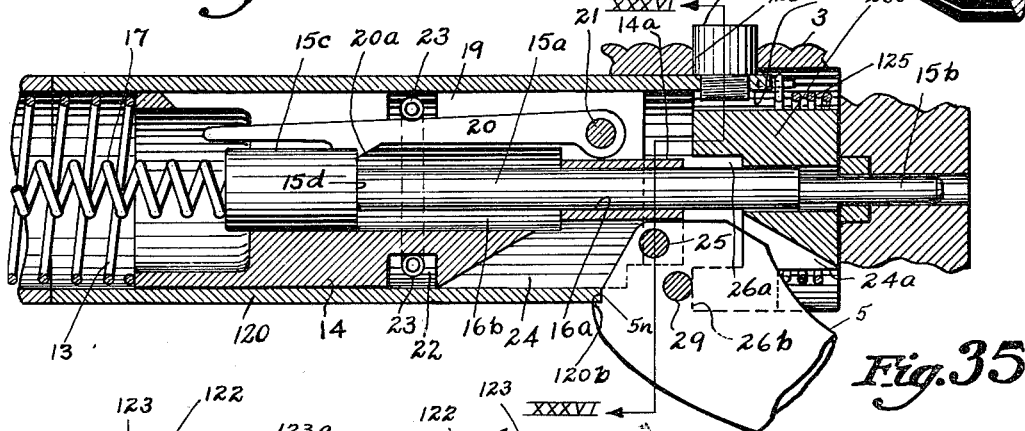
Figures 36, 37:
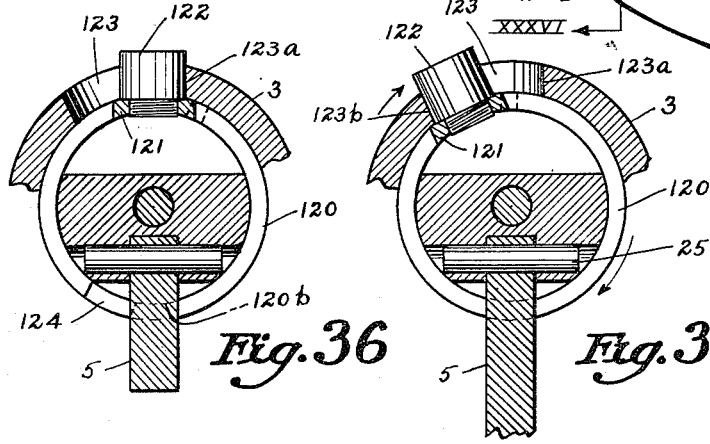
Figure 38:
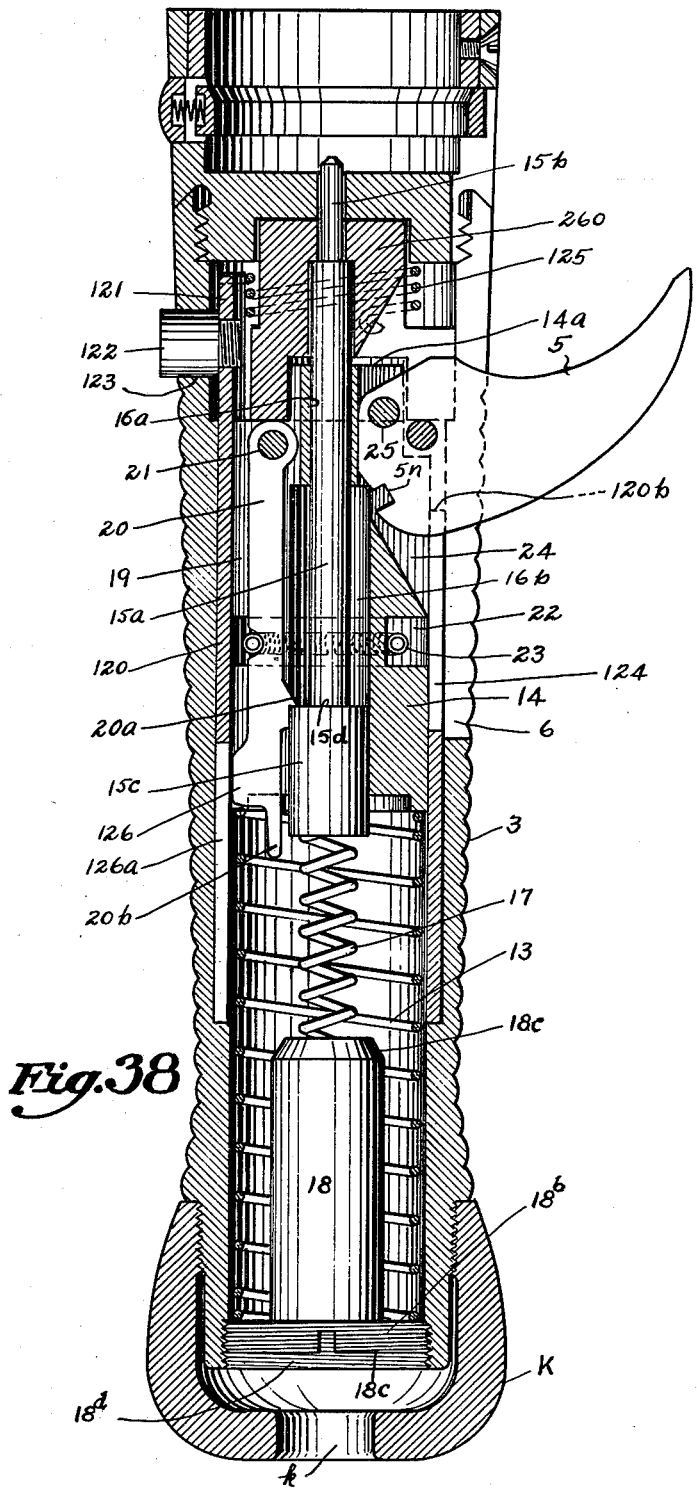

In the accompanying drawings Fig. 1 is a view in side elevation of a tear-gas billy embodying my invention; Fig. 2 is a fragmentary view to larger scale, showing the medial body portions, and internal structure, of the billy in longitudinal and internal structure, of the billy in longitudinal section; Figs. 3 to 6, inclusive, are fragmentary views of the firing mechanism in axial section, and illustrating successive operating positions of the parts; Fig. 7 is a view in axial section of the breech-block of the billy, and Fig. 8 is a fragmentary view in side elevation of the barrel portion which is assembled with the breech-block; Fig. 9 is an elevation of the mouth of the breech-block, and Fig. 10 is a sectional view thereof, taken on the plane X—X, Fig. 7; Figs. 11 to 13 are fragmentary sectional views, illustrating the operation of particular locking means while the barrel and breech-block are being assembled; Figs. 14 and 15 are skeleton views, indicating how the trigger of the weapon is utilized in safety position, to release the locking means; Fig. 16 is a fragmentary view, showing in side elevation the members of the firing mechanism which cooperate immediately with the trigger, and Fig. 17 is a view in section of the same, taken on the plane XVII—XVII, Fig. 16; Fig. 18 is an exploded view, illustrating partly in side elevation and partly in section the breech-block and the body members of the billy that in assembly are integrated therewith; Fig. 19 is a fragmentary view, showing in side elevation the handle casing and the trigger slot provided therein; Fig. 20 is a view in side elevation, illustrating how the firing mechanism is assembled as a unit with the handle casing; Fig. 21 illustrates fragmentarily the barrel portion, including a cartridge, in course of assembly with the handle of the billy; Fig. 22 is a perspective view of the billy in the right hand of the user, and illustrating how the barrel portion, grasped in the hand of an adversary, is freely rotatable relatively to the stock; Fig. 23 is a view in end elevation of the barrel, showing a modification in the means for locking it to the breech-block, and Fig. 24 is a side elevation of the same; Fig. 25 is a sectional view of the modified breech-block, and Fig. 26 is an end elevation of the same; Fig. 27 is a fragmentary view, showing in side elevation the modified locking member, and Figs. 28 and 29 are end elevations of the same in alternate positions of adjustment; Fig. 30 is a sectional view of the breech-block, illustrating still another modification in the locking means, and Fig. 31 is a view in end elevation of the same; Fig. 32 is a detailed view, illustrating the breech-block fragmentarily and showing the locking member of the last-mentioned locking means in end elevation; Fig. 33 is a view partly in side elevation and partly in vertical section, showing in detail the firing-pin and release arm of the firing mechanism, and Fig. 34 is a similar view, showing additionally, however, the means for swinging the arm into release position; Fig. 35 is a sectional view, comparable with Fig. 3, and illustrating certain modifications in the firing mechanism; Fig. 36 is a sectional view of the same, taken on the plane XXXVI—XXXVI of Fig. 35, and Fig. 37 is a view similar to Fig. 36, showing the parts in alternate positions; and Fig. 38 is a longitudinal, central sectional view of the billy handle or stock, embodying the modified firing mechanism, and showing still other modifications.

Referring to Figs. 1 and 2, the billy comprises a handle A and a head B. The head B comprises a metal barrel 1 covered with a leather facing 2, and the handle A comprises a metal casing 3 which is externally corrugated to afford secure grip in the hand of the user. The barrel 1 is adapted to receive a tear-gas cartridge, and the casing 3 houses mechanism which is subject to the control of a trigger 5 for firing the cartridge.

A breech-block 4 is secured by threads 7 to the casing 3, and a set-screw L locks the parts against relative rotation. The integrated breech-block and casing form the stock of the firearm.

The breech-end of the barrel 1 is provided with an offset, cylindrical portion 11 which in assembly is secured in the chamber 4a (Fig. 7) of the breech-block. The barrel 1 in this case is removed from assembly for loading, and Fig. 21 indicates a tear-gas cartridge C being inserted. The cartridge is thrust inward of the barrel to such position that its rim c abuts the end 11a of barrel portion 11. Then the barrel is assembled with the stock.

It is desirable that removal of the barrel 1 shall be impossible when the weapon is ready for firing. On the other hand, it is desirable that the barrel may be readily removable for loading. With these desiderata in mind, it will be perceived that I have provided particularly effective means for securing the barrel in assembly with the stock.

Such means comprise a locking ring 8 in the chamber 4a of the breech-block; a shoulder 9a in the body of the breech-block and a keeper ring 9, fixed to the block by screws 9b, serve to secure the locking ring 8 axially between them; the forward edge 8a of the ring 8 is chamfered, as shown in Fig. 7, and a compression spring 10, bearing upon the side of the ring 8, urges it into a position of eccentricity with respect to chamber 4a (see Figs. 9 and 10). The spring 10 is introduced to the assembly through a passage 10a in the breech-block, which passage is normally closed by a plug 10b. An annular groove 11b is provided in the portion 11 of the barrel 1, and, in the assembly of the barrel 1 with the stock, the groove 11b receives the ring 8 in locking engagement. When making such assembly, the portion 11 of the barrel is thrust axially into the breech-block (see Figs. 7 and 8). Upon entering the breech-block, the end 11a of the barrel engages the tapered edge 8a of the locking ring (Fig. 11), and forces the ring, against the resistance of spring 10, into a position concentric with barrel portion 11, whereby the barrel portion may continue inward to the position indicated in Fig. 12. It will be observed that the barrel portion 11 is formed with a shoulder 11c, complementary in form with the forward edge 4c of the breech-block. The proportions of the parts are such that the groove 11b is aligned with the ring 8 when the shoulder 11c abuts the edge 4c, whereby, under the influence of spring 10, the ring moves eccentrically into the groove. Throughout substantially one-half of its circular extent (Figs. 9 and 10) the ring lies in engagement with the groove, locking the barrel against removal. In such assembly the end 11a of the barrel portion 11 lies an interval c1 (Fig. 2) from the end wall 4b of the breech-block, and thus provides clearance for the rim c (Fig. 3) of the cartridge.

It will be understood that the engagement of the ring 8 in the annular groove 11b, while positively locking the parts in assembly, admits of the rotation of the barrel 1 relatively to the stock or handle 3, 4. As will presently appear in greater detail, the trigger 5 is adjustable between firing and safety positions, and means are provided for securing the trigger in such alternate positions. The full lines 5 represent the trigger in firing position in Fig. 1, while the dotted lines 5a indicate it in safety position. It is characteristic of my tear-gas weapon that the trigger must be in safety position to admit of the removal of the barrel 1, and, advantageously, the trigger itself (in safety position) is the instrumentality by means of which the barrel is released. Accordingly, when the weapon is in the hand and ready for firing, it is impossible to remove the barrel 1. Fig. 22 shows the weapon in the hand H of the user. If an adversary at close quarters grasps the barrel 1 (see hand h), he cannot, by twisting or pulling, remove the barrel from the weapon. The barrel rotates freely in the adversary's grasp, but remains locked in assembly with the handle held in the user's hand H. Furthermore, it is substantially impossible for the adversary so to twist the weapon as to turn the trigger from its position beneath the "firing" finger of the user.

The casing 3 includes a trigger slot 6 which extends through the forward edge 3a of the casing. The edge 3a of the casing is tapered, and the breech-block 4 includes a correspondingly tapered shoulder 3b which tightly engages the edge 3a, and reinforces it against such weakness as the slot 6 may occasion. Referring to Fig. 2, it will be seen that the breech-block is provided with a slot 6a which is aligned with the slot 6. The face of the locking ring 8 is accessible within the slot 6a, at a point diametrically opposite to the point at which the spring 10 is effective upon the ring.

In safety position the distal end 5b of the trigger lies adjacent that portion of the locking ring 8 which is exposed in the slot 6a—note the dotted lines 5a in Figs. 2 and 10, and the full lines 5 in Fig. 14. While the trigger is in safety position, it may be pressed inward of the stock 3, 4 in such manner that its distal end 5b is brought to bear against the locking ring 8. Further inward pressing of the trigger is effective to shift the locking ring 8 to concentric position, relatively to the barrel portion 11 (Fig. 15), whereby the ring is disengaged from the groove 11b, and the barrel 1 is released for removal.

In Figs. 23 to 31, I illustrate modified means for locking the barrel 1 in assembly with the breech-block. The breech-end of the barrel is provided with screw threads 110, and the wall 400a of the breech-block is correspondingly screw-threaded. Advantageously, a multiple thread screw is employed, thereby minimizing the number of turns required to remove or assemble the barrel. Adjacent to and integrated with the threaded portion 110 is a ratchet portion 110a, and in the breech-block 400 a cooperating pawl is provided. The pawl comprises a cylindrical body 400b (Fig. 27), from which a straight spring wire 400c radially projects; to opposite sides of the spring wire, the body of the pawl includes two semicylindrical projections or arms 400d and 400e, and such semicylindrical arms lie one above and the other below the horizontal axis of the pawl, as shown in Fig. 27. The breech-block 400 is provided with a cylindrical bore 400f (Fig. 25) in which the pawl is secured, by the engagement of the spring wire 400c in a hole 400h, formed in the body of the block. The arm 400e of the pawl extends into the chamber of the breech-block, and the arm 400d is accessible (through the slot 6a, already described) to the distal end 5b of the trigger in safety position. The flat sides f and f' of the respective semicylindrical pawl arms 400d and 400e are inclined to the straight spring wire 400c, as will be understood upon consideration of Fig. 29.

When the barrel 1 is screwed into assembly with the breech-block, the ratchet portion 110a is engaged laterally by the pawl arm 400e. The teeth t of portion 110a are so shaped that as each tooth engages and moves (during barrel-assembling rotation) across the inclined face f of the arm 400e, the pawl is turned axially, flexing the spring 400c, as indicated in Fig. 28. As each tooth passes from engagement with face f, the spring instantly restores the pawl to its normal position (Fig. 29), in which position the higher edge f'' of the face f so engages the adjacent tooth t that counter-rotation is positively prevented. Thus, during the barrel-assembling rotation, the teeth of ratchet portion 110a pass successively across the face f of arm 400e, and cause the pawl axially to oscillate. When, however, barrel-removing rotation is attempted, the pawl manifestly operates as a lock.

In order to release the barrel for removal, it is essential that the pawl be held in the release position shown in Fig. 28. It will be understood that the face f' of pawl arm 400d normally lies inclined to the flat end 5c of the trigger in safety position (see Fig. 29). By pressing the trigger inward of the slot 6, the edge 5c is brought to bear forcefully against the pawl face f', with the consequence and effect that the pawl is turned axially until its face f' lies flat against the end of the trigger. Thus, the arm 400e of the pawl is angularly shifted into release position, and in such position it remains, so long as the trigger is held depressed, to admit of the removal of barrel 1.

Figs. 30 to 32 illustrate a resilient detent 500, providing still another modification in the locking means. The detent is shown as comprising a flat leaf spring secured, say by means of a screw 500b, in a recess 500a in the body of the breech-block; the end 500c of the leaf spring projects into the chamber (400a) of the breech-block, and is longitudinally inclined, as shown in Fig. 30. The end 500c of the spring is adapted yieldingly to engage the teeth t of the barrel portion 110a; and such yielding end of the spring is transversely inclined in the manner indicated in Figs. 31 and 32. Manifestly, the spring detent readily admits of the barrel-assembling rotation of the parts (cf. the arrow in Fig. 32), but prevents counter-rotation.

Again, I provide means responsive to the trigger in safety position for releasing the locking device. And in this case such means comprise a ring 500d which is housed in the breech-block and bears peripherally against the inner face of the leaf spring. The ring 500d is movable eccentrically of the breech-block, and is responsive to pressure applied by the distal end 5b of the trigger, to flex the detent 500 outward, and free of the teeth t, see dotted line position in Fig. 32. Accordingly, upon depressing the trigger in safety position, the barrel 1 may be removed from the breech-block.

Figure 5:
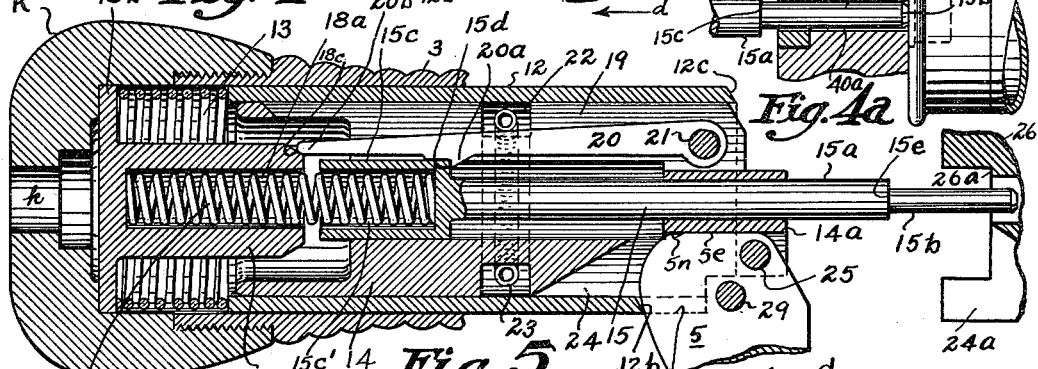
Figure 6:
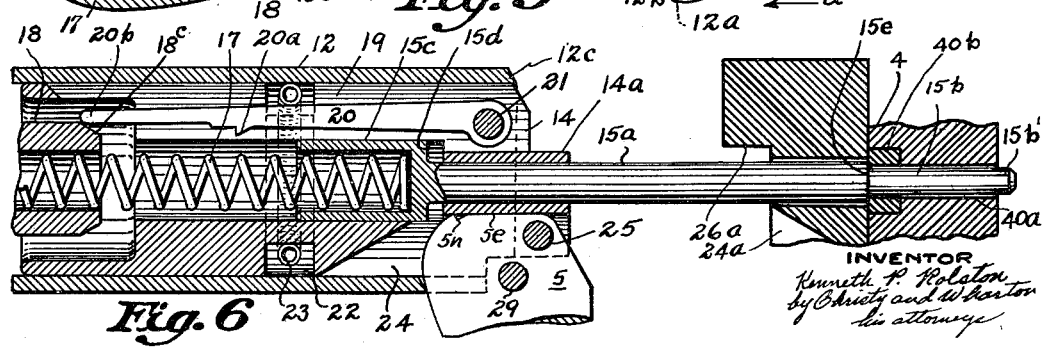

Turning again to Fig. 2, the firing mechanism will be considered in detail. Within the casing 3 is a sleeve 12. A compression spring 13 backs the sleeve, and normally urges it forward. Within the sleeve 12 a trigger carriage 14 is slideably organized, and the trigger carriage in this case is an integral, substantially cylindrical body of metal. The carriage 14 includes a central bore in which a firing-pin is reciprocable; the firing-pin comprises an elongate, cylindrical stem portion 15a, a relatively short primer portion 15b of relatively small diameter, and a cylindrical socket portion 15c of relatively large diameter; and the bore of the carriage comprises two regions 16a and 16c of unequal diameters, to accommodate the firing-pin portions 15a and 15c, respectively. A trip-block 18 is provided in the casing 3, and, as shown in Fig. 5, the firing-pin and trip-block include sockets 15c' and 18a, respectively, in which the opposite ends of a helical spring 17 are seated. It will be observed that the trip-block includes a flange 18b, against which the spring 13 bears; the flange is backed by a handle knob K on the casing, and thus the trip-block affords backing for the two springs 13 and 17.

The trigger carriage 14 includes an elongate slot or recess 19, in which a latch-arm 20 is swingably secured (adjacent its forward end) upon a pin 21; the pin 21 extends transversely of the carriage, and the arm 20 is provided with a latch element 20a adapted to engage a shoulder 15d on the firing-pin. An annular groove 22 is formed in the body of the carriage 14 and intersects the slot 19; a coiled, circular spring 23 is arranged in the groove and engages the outer edge of the latch-arm, serving yieldingly to hold the latch arm 20 against the shoulder on the firing-pin.

The carriage 14 is provided with a nose portion 14a, and such nose portion, together with the body of the carriage rearward thereof, includes a slot 24 in which the trigger 5 is swingably secured upon a pin 25. Between the carriage 14 and the breech-block 4 is an intermediate block 26, carrying a push-button 27 which, under the outward urging of a spring 28, projects into an orifice 27a in the casing 3 (cf. Fig. 2). The block 26 is recessed at 26a, to receive the nose portion 14a of the trigger carriage, and is longitudinally slotted or recessed, as shown at 24a. The recess 24a is aligned with the slot 24 in the trigger carriage, and in effect comprises a continuation of the slot 24 in which the trigger 5 is swingably secured. The intermediate block 26 and the breech-block 4 are centrally bored for the passage through of the firing-pin; the bore 26c in the intermediate block is larger in diameter than the stem portion 15a of the firing-pin, while the bore 40a of the breech-block is relatively small, affording passage for the primer portion 15b only of the firing-pin.

A pin 29 is carried by the trigger 5, and is located eccentrically of the axis (25) about which the trigger is swingably secured to the carriage 14. The pin 29 projects rigidly from the opposite sides of the trigger, and normally abuts the rear face 26b of the intermediate block, at points on opposite sides of the slot 24a. It will be observed that, as the trigger is swung into safety position (see arrow a in Fig. 2), the pin 29 acts as a fulcrum against the face 26b of the stationary block 26, whereby the carriage 14 (due to the swing of the pin 25 about the fulcrum) is moved in the direction of the arrow b. Due to the engagement (15d, 20a) of the latch-arm 20 with the firing-pin, the firing-pin moves with the carriage 14 during such swinging of the trigger, and in consequence the spring 17 is compressed. As the trigger enters safety position (see Fig. 3), the firing-pin reaches such retracted position that its primer tip 15b' lies an interval s within the bore 40a of the breech-block, safely removed from the primer cap $c'$ of the cartridge C in the weapon. The trigger is provided with a flat edge portion $5e$, and a notch $5n$. The forward edge of the sleeve 12 includes a slot $12a$, whose base $12b$ comprises a latch, and, when the trigger is swung into safety position, the spring 13, in urging the sleeve 12 forward, causes the latch $12b$ to engage the notch in the trigger. Thus, the trigger is positively locked in safety position. It will be seen that, while the trigger 5 is secured from swinging outward into firing position, the engagement of the sleeve 12 with the notch $5n$ admits of a slight inward (upward in Fig. 3) movement of the trigger, to effect the release of the barrel-locking means in the manner described above.

I have found that, when the firing mechanism is thus locked in safety position, a violent blow directed against the side of the casing 3, or the impact occasioned when the weapon falls to the ground from a substantial height, tends to jar the latch-arm 20 from engagement with the shoulder $15d$ of the firing-pin. To the end that any such tendency shall be minimized, the shoulder $15d$ of the firing-pin is formed with an inward taper $v$ (Fig. 33), and the effective edge of the latch-element $20a$ is correspondingly tapered. (As a matter of convenience the firing pin is shown to be directed to the left in Figs. 33, 34, whereas it is directed to the right in the other figures of the drawings.) The inwardly tapered shoulder $15d$, as engaged by the latch element $20a$, resists the outward swinging of the latch-arm 20, and cooperates with spring 23 in insuring against accidental release of the firing-pin.

Figure 3:
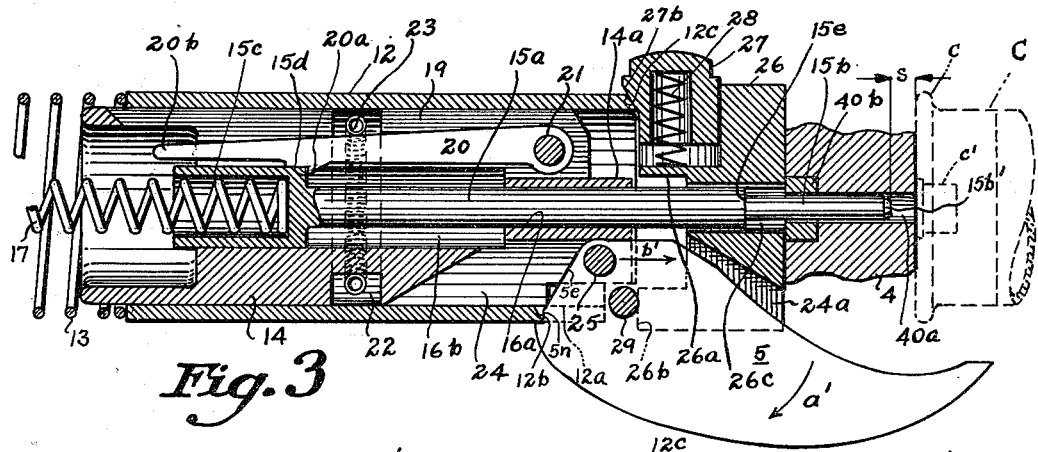
Figures 4, 4A:
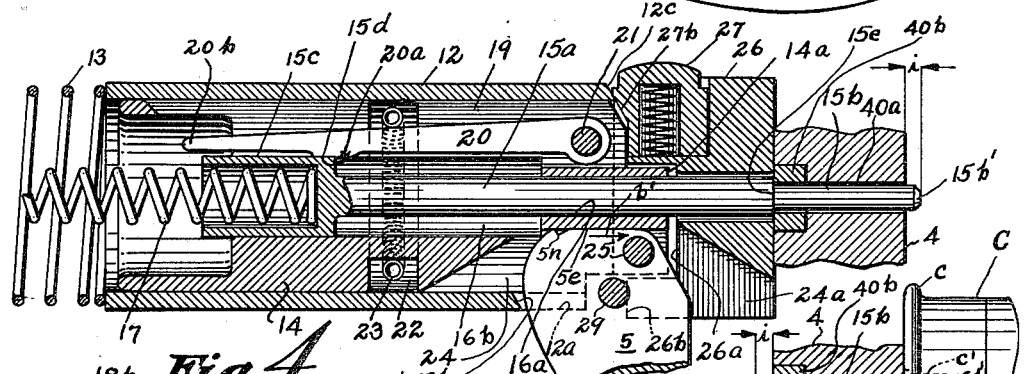

To prepare the weapon for firing, the push-button 27 is depressed. The forward edge of the sleeve 12 is tapered, as indicated at $12c$ in Fig. 3, and the push-button includes a tapered shoulder $27b$ which slidably engages the edge $12c$. Upon the depression of the push-button, the shoulder $27b$ forces the sleeve 12 to the left, whereby the sleeve is freed from engagement with the notch $5n$ of the trigger. The force of the compressed spring 17 (acting through the firing-pin and the latch-arm 20) moves the carriage 14 forward, and, in consequence, the pin 25 is shifted in the direction of the arrow $b'$ (Fig. 3). Such movement of the pin 25 in turn effects the swing of the trigger about the pin 29 bearing against the stationary edge $26b$ of block 26, whereby the trigger, swinging in the direction indicated by the arrow $a'$, comes to rest in firing position (Fig. 4). In firing position the edge $5e$ of the trigger bears against the base of the slot 24 within the carriage 14, and the forward thrust of the spring 17, still reacting upon the pin 25 (cf. arrow $b'$, Fig. 4), serves to stay the trigger in firing position. Upon releasing the push-button 27, the sleeve 12 is freed to the influence of spring 13; the spring 13 urges the sleeve to the right, Fig. 4, and, in consequence, the sleeve moves into yielding engagement with the edge of the trigger, as shown at $12b$ in Fig. 5. Such yielding engagement assists in securing the trigger in firing position.

It will be observed that, when the trigger swings outward from safety position, the carriage 14 moves forward, advancing the firing-pin in the bore $40a$ of the breech-block. When there is no cartridge in the weapon, the primer tip $15b'$ of the firing-pin projects an interval $i$ (Fig. 4) into the breech-block chamber; the shoulder $15e$ formed on the firing-pin engages the body of the breech-block adjacent the mouth of bore $40a$, and limits the extent to which the primer portion $15b$ of the firing-pin projects. To effect a firing operation of the mechanism, the trigger is pulled in the direction of arrow $d$ in Fig. 4. The engagement of the trigger edge $5e$ with the body of the carriage, to the rear of pin 25, prevents an angular movement of the trigger in consequence of the pull. The trigger moves longitudinally of the slot 6 (Fig. 2), carrying the sleeve 12 and the carriage 14 rearward (to the left, Fig. 4), and the engagement of the latch-arm 20 with the firing-pin unites the carriage and firing-pin during such rearward movement. Accordingly, compression of the spring 17 is effected.

As shown in Figs. 5 and 34, the trip-block 18 includes a cam which in this case consists in a tapered surface $18c$. As the trigger in firing operation approaches the inner end of slot 6 (Fig. 2), the distal end $20b$ of the latch-arm engages and slides over the surface $18c$ (Fig. 5). The sliding engagement of the tip $20b$ with the trip-block 18 is effective to swing the latch-arm outward against the resistance of spring 23; and, accordingly, the latch-element $20a$ is removed from engagement with the shoulder $15d$ of the firing-pin. The firing-pin, freed of restraint, is violently propelled forward under the energy of compressed spring 17, and the primer tip $15b'$ is violently projected into the cartridge chamber of the breech-block.

In the case under immediate consideration, the weapon is empty—there is no cartridge in the barrel 1. The forward propulsion of the firing-pin is interrupted when the shoulder $15e$ comes to abutment with the breech-block. The impact of the firing-pin is dissipated by the body portion of the breech-block adjacent the mouth of bore $40a$, and, advantageously, an anvil portion $40b$ of relatively hard metal is embodied in the breech-block, whereby the repeated operation of the weapon (when empty) will not cause damage or undue wear.

I shall now consider the operation when the weapon is loaded. The head of the cartridge C, introduced to the weapon, is secured in the breech-block, and the primer cap $c'$ of the cartridge lies immediately before the bore $40a$. As already mentioned, the firing mechanism must be in safety position to admit of loading; when, therefore, the weapon has been loaded and is about to be fired, the push-button 27 is depressed. The trigger 5 swings into firing position, the carriage 14 moves forward into the position described above, but the firing-pin does not move so far as before—it moves forward until its primer tip $15b'$ comes into contact with the primer cap $c'$ of the cartridge, whereby the shoulder $15e$ lies an interval $i$ from the breech-block, as shown in Fig. 4a. It may be remarked of Fig. 2 that, while the cartridge is omitted from the drawing for the sake of clarity, the firing-pin is shown in the position which it occupies when the weapon is loaded and ready for firing.

When the trigger of the loaded weapon is pulled and the firing-pin is sprung, the tip $15b'$ violently strikes and indents the primer cap $c'$ of the cartridge, and in well-known manner effects its discharge.

When the firing-pin has been sprung and the trigger is released (note Fig. 6), the sleeve 12 (under the influence of spring 13) moves forward (to the right) into its normal position. By virtue of the engagement of the sleeve with the trigger at $12b$, the trigger and carriage 14 are carried forward by the sleeve 12, and the latch-arm 20 is moved to the right along the side of the then stationary firing-pin 15. The tip of the latch-element 20a slides along the side of the firing-pin portion 15c, and, as the carriage reaches its normal position (Fig. 4), the latch-element engages the shoulder 15d of the firing-pin. The firing mechanism is thus restored to its normal position, ready for another firing operation.

It will be understood that my trigger mechanism is particularly designed for service in the elongate and relatively small bore of a billy handle. It is further characteristic of my mechanism that it is adapted for ready assembly with the billy. In making such assembly, the trip-block 18, springs 13, 17, firing-pin 15, trigger carriage 14, trigger 5, and sleeve 12 are first brought together in their proper relative positions (Fig. 5), and then are introduced as a unit into the forward end of the casing 3. The slot 6, opening through the edge 3a of the casing 3, receives the trigger 5, whereby the whole trigger mechanism may be slid into place, as indicated by the arrow in Fig. 20. Next, the intermediate block 26 is introduced to the casing 3; this is readily accomplished by depressing the push-button 27, and inserting the block in the forward end of the casing, as indicated by the arrow in Fig. 18; the wall of the casing holds the push-button 27 depressed until it comes to registry with the orifice 27a, whereupon the spring 28 forces the push-button outward into such orifice. The engagement of the push-button in the orifice secures the block 26 in the handle casing. Of course, the breech-block 4 is then assembled in the manner already described.

It is important to note that the sleeve 12 serves as a closure for the slot 6, protecting the mechanism within the casing from dust and dirt. As the trigger slides along the slot, the sleeve 12 moves with it, and normally covers that portion of the slot which is not closed by the body of the trigger itself.

Alternately, the slot-protecting sleeve may be rotatably organized in fixed axial position within the casing 3, and in Figs. 35 to 38 such organization of a sleeve 120 is illustrated. The sleeve 120 includes a tongue 121 to which a button 122 is secured; the casing 3 is provided with a circumferentially extending slot 123, and through this slot the button 122 projects.

Save as hereinafter mentioned, the firing mechanism organized within the sleeve 120 is substantially identical with the firing mechanism already described. While in this case the spring 13 bears directly against the trigger carriage 14, instead of against the sleeve, the operation of the mechanism in firing a cartridge is essentially the operation which has been explained above.

As appears in Figs. 36 and 38, the sleeve 120 includes an elongate slot 124 which is adapted to register with the slot 6 in casing 3, to provide a way for the linear movement of the trigger 5 in firing position (see Fig. 38 particularly). A torsional spring 125 is secured at its one end to the tongue 121 of the sleeve; the opposite end of the spring is attached to a non-rotatable member, say the wall of casing 3, or the body of the intermediate block 260; and the tendency of the spring 125 is to turn the sleeve 120 clockwise (Figs. 36 and 37) to such position that the button 122 yieldingly engages the end 123a of the slot 123. Indeed, when the trigger is in safety position (Fig. 35), the button is yieldingly held in such position in the slot 123. The corresponding position of the sleeve 120 is such that the slot 124 lies out of such registry with the slot 6 (see Fig. 36), and the edge 120b of the sleeve, adjacent the slot, engages the notch 5n in the trigger, serving positively to lock the trigger in safety position (Fig. 35).

Manifestly, when the trigger is in safety position, the sleeve 120 provides the desired protective closure for the slot 6.

To release the trigger from safety position, the button 122 is shifted against the restraint of torsional spring 125; that is, the button is moved from the position shown in Fig. 36 to the position shown in Fig. 37. Accordingly, the sleeve 120 is rotated, bringing the slot 124 into registry with the slot 6 in the casing 3 (Fig. 38), and removing the edge 120b of the sleeve from engagement with the notch 5n. The trigger swings (about pin 29 as a fulcrum) into firing position. In firing position the rear edge of the trigger lies within the slot 124, and the sleeve 120 is thereby restrained from turning back into safety position, when the lateral pressure on the button 122 is relieved. The trigger in firing position is pulled in the manner already described, to spring the firing-pin and discharge the weapon.

When the trigger is swung from firing position into safety position, the carriage 14 and firing-pin 15 move rearwardly, as explained in the first-described structure, and the notch 5n comes into alignment with the edge 120b of sleeve 120. Thereupon, the sleeve turns (clockwise, Fig. 37) under the influence of torsional spring 125, and moves the edge 120b into engagement with the notch 5n, whereby the trigger and firing mechanism are locked in safety position.

Fig. 38 is illustrative of still another modification. The latch-arm 20 may include a tang portion 126, and the sleeve 120 may include a cooperating slot 126a. The slot 126a is so located relatively to the slot 124 circumferentially of the sleeve that, when the slot 124 registers with the slot 6, and the trigger is in firing position, the slot 126a lies in alignment with the tang 126. Accordingly, when the trigger is pulled and the latch-arm swings outward to release the firing-pin, the tang 126 enters the slot 126a. When, however, the trigger is in safety position, the slot 126a lies out of alignment with the tang 126. If the latch-arm tends to swing into release position, it is restrained by the engagement of the tang 126 against the internal surface of the sleeve 120. Therefore, so long as the trigger is in safety position, it is absolutely impossible for the latch-element 20a to move from engagement with the shoulder 15d. Accordingly, the weapon may be used as a bludgeon, and may be subjected to other sorts of rough or violent usage, without danger of accidental discharge.

It will be understood that in all forms of my billy the handle knob K may be removably secured to the casing 3, and may be provided with a hole k (Fig. 38). In accordance with usual practice, the ends of a leather thong may be passed through the hole k, and may be knotted and secured within the knob, in such fashion that the main reach of the thong provides without the knob a wrist strap for the user.

It may also be remarked that the flange 18b of the trip-block may be secured in threaded engagement with the casing 3, as shown in Fig. 38. In position of service the face 18d of the flange advantageously lies within the end of the casing, providing a recess 18e which may be filled with sealing wax, and the sealing wax may be impressed with the trade-mark of the manufacturer. The screw-type flange (18b, Fig. 38) affords adjustment of the trip-block axially of the casing 3, whereby the fixed position of the cam face 18c may be properly oriented with the tip 20b of the latch-arm. The sealing wax, when shaped and hardened in the recess 18e, secures the parts in their relative positions of adjustment. If the knob K should become loose in service, the adjustment of the trip-block is not disturbed. And, furthermore, the sealing wax prevents tampering, or, if there be tampering, it can readily be detected.

I claim as my invention:

1. In a billy the combination of a barrel in which to discharge a cartridge, a handle, said barrel being removably secured to said handle, a device for normally locking said barrel against removal from said handle, a trigger adjustable between firing and safety positions, means responsive to said trigger in safety position for releasing said locking device, a firing-pin, and mechanism in said handle responsive to said trigger in firing position for operating said pin to fire the cartridge in said barrel.

2. In a billy the combination of a barrel in which to discharge a cartridge, a handle, said barrel being removably secured to said handle, a device for normally locking said barrel against removal from said handle, a trigger swingable between safety and firing positions, means responsive to the depression of said trigger in safety position for releasing said locking device, and firing-pin mechanism in said handle for firing the cartridge in said barrel, said trigger (in its firing position) being movable in linear path for operating said firing-pin mechanism.

3. In a billy the combination of a barrel in which to discharge a cartridge, a handle, said barrel being removably secured to said handle, a device for normally locking said barrel against removal from said handle, a trigger movable between safety and firing positions, means responsive to movement of said trigger in safety position for releasing said locking device, releaseable means for securing said trigger in safety position while admitting of trigger movement for the release of said locking device, and firing-pin mechanism operative in response to movement of said trigger in firing position.

4. In a billy the combination of a handle and a cartridge-receiving barrel removably secured to said handle, a trigger movable between firing and safety positions, mechanism responsive to said trigger in firing position for firing a cartridge in said barrel, and means for normally locking said barrel to said body portion, said trigger being movable in safety position to release said locking means.

5. A weapon comprising a body portion, a cartridge-receiving barrel, means for locking said barrel in assembly with said body portion, mechanism for firing a cartridge in said barrel, a trigger movable between firing and safety positions, means for locking the trigger in safety position, said trigger being adapted (when locked in safety position) to withhold said mechanism from firing operation, and means effective (when and only when said firing mechanism is under such restraint) to release said locking means, whereby said barrel may be removed from said body portion.

6. A weapon comprising a body portion, a barrel adapted to receive a cartridge, mechanism in said body portion for firing said cartridge, a slot in said body portion, a trigger serviceable in alternate positions, means cooperating with the trigger in one of said positions for locking said mechanism against cartridge-firing operation, and in its alternate position said trigger being movable longitudinally of said slot for operating said cartridge-firing mechanism, and means movable with said trigger for shielding said slot.

7. A weapon comprising a body portion and a barrel adapted to receive a cartridge, mechanism in said body portion for firing said cartridge, a slot in said body portion, a trigger projecting from said slot and movable therealong for operating said firing mechanism, and means cooperating with the body portion of said trigger lying within said slot and movable with said trigger for shielding said slot.

8. In a firearm, a body portion, a trigger, a spring-backed member in said body portion movable in response to the pulling of said trigger, a spring-backed firing-pin, an elongate latch-arm pivotally secured adjacent its one end to said member, a latch-element carried by said arm intermediate its opposite ends, a shoulder on said firing-pin normally engaged by said latch-element for uniting said member with said firing-pin for common travel when said trigger is pulled, and means engaged by the distal end of said latch-arm for shifting said latch to release said firing-pin when said travel has progressed through a predetermined interval.

9. In a firearm, a barrel, a stock, cartridge-firing mechanism comprising a carriage movable relatively to said stock, a spring resisting movement of said carriage in one direction, a trigger pivotally secured to said carriage, an abutment in said stock, off-center means carried by said trigger normally resting against said abutment and serving to stay said trigger in firing position, said trigger being movable about said abutment as a fulcrum whereby said carriage is shifted into safety position, means for securing said carriage and said trigger in safety positions, and means accessible externally of said body portion for releasing said trigger and carriage from said safety positions.

10. A weapon including a firing barrel and a handle, said handle including firing mechanism, said barrel being externally fashioned to serve as a billy head, and means for securing said handle and barrel in assembly, whereby the weapon may be used either as a billy or a firearm, said barrel being freely rotatable relatively to said handle in such assembly, whereby the weapon may be readily retained in operative position in the hand of the user even though an adversary at close quarters grasps and twists or turns the barrel or billy head.

11. A firearm including a firing barrel and a stock and means for securing them in assembly, said means including a groove in one of said members and a ring movable eccentrically in the other of said members for locking engagement with said groove, a spring tending to hold said ring in position of eccentricity, and means accessible externally of the assembly for shifting said ring in opposition to said spring and thereby moving said ring from said locking engagement with said groove.

12. A firearm including a firing barrel and a stock and means for securing them in assembly, said means including a groove in one of said members and a ring in the other, said ring being movable eccentrically of the assembly, a spring tending to hold the ring in position of eccentricity and in locking engagement with said groove; firing mechanism in said stock, a trigger for operating said mechanism, said trigger being movable between safety and firing positions, means for staying said trigger in safety position, said trigger being movable while stayed in such safety position for shifting said ring eccentrically and in opposition to said spring.

13. A firearm including a barrel, a stock, and firing mechanism including a trigger, a carriage movable in said stock in response to the firing operation of said trigger, a firing-pin, a latch-arm normally engaging said firing-pin, means for effecting the disengagement of said latch-arm from said firing-pin, and an element movable between alternate positions in said stock, able between alternate positions said element providing in one of said positions said element providing positive restraint against the movement of said latch-arm from engagement with said firing-pin.

14. A firearm including a barrel, a stock, and firing mechanism including a trigger, a carriage movable in said stock in response to the firing operation of said trigger, a firing-pin, a latch-arm normally engaging said firing-pin, means for effecting the disengagement of said latch-arm from said firing-pin, an element including a clearance for the latch-arm to move from engagement with said firing-pin, said element being movable between alternate positions in said stock, whereby said clearance may be adjusted in and out of registry with said latch-arm.

15. A firearm including a barrel, a stock, and firing mechanism including a trigger, a carriage movable in said stock in response to the firing operation of said trigger, a firing-pin, a latch-arm normally engaging said firing-pin, means for effecting the disengagement of said latch-arm from said firing-pin, said stock including a slot in which said trigger is movable, and an element adjustable in said stock alternately to cover and uncover said slot.

16. A firearm including a barrel, a stock, and firing mechanism including a trigger, a carriage movable in said stock in response to the firing operation of said trigger, a firing-pin, a latch-arm normally engaging said firing-pin, means for effecting the disengagement of said latch-arm from said firing-pin, said trigger being adjustable between safety and firing positions, a slot in said stock in which said trigger is movable, an element movable in said stock alternately to cover and uncover said slot, said element in slot-covering position providing means for positively locking said trigger in safety position.

17. A firearm including a barrel, a stock, and firing mechanism including a trigger, a carriage movable in said stock in response to the firing operation of said trigger, a firing-pin, a latch-arm normally engaging said firing-pin, means for effecting the disengagement of said latch-arm from said firing-pin, said trigger being adjustable between safety and firing positions, a slot in said stock in which said trigger is movable, an element movable in said stock alternately to cover and uncover said slot, said element in slot-cover-ing position providing means for positively locking said trigger in safety position, said element further comprising means for positively securing said latch-arm in engagement with said firing-pin while it (said element) is in said slot-covering position.

18. A firearm including a barrel and a tubular body portion secured to said barrel, firing mechanism, said mechanism including a trigger, a spring, and a member movable (in response to the firing operation of said trigger) axially of said tubular body portion against the resistance of said spring, a firing-pin movable axially of said member, a substantially rigid latch pivotally mounted on said member for uniting said firing-pin with said member for common movement against the resistance of said spring, and means adapted during the spring-resisted movement of said member to engage said latch at a point spaced from its pivotal mounting and to effect the movement of the latch from engagement with the firing pin, whereby said firing-pin is released from union with said member.

19. A firearm including a body portion, mechanism in said body portion, said mechanism comprising a spring, a member movable against the resistance of said spring, a firing-pin, a pivotally mounted, substantially rigid latch for uniting said firing-pin with said member during such movement against the resistance of said spring, and means adapted, during the spring-resisted movement of said member, to engage said latch at a point spaced from its pivotal mounting and to effect the swing of said latch to release said firing-pin from its union with said member, said latch comprising an arm pivotally secured to said movable member, and said latch-releasing means comprising a stationary cam adjustably secured in said body portion.

20. A firearm including a barrel, a stock, and cartridge-firing mechanism including a carriage movable within the stock, a spring normally tending to move said carriage forward in said stock, a trigger pivotally mounted on said carriage, an abutment in said stock, said trigger including an element located eccentrically of its pivotal mounting, and said eccentric element normally engaging said abutment and resisting the tendency of said spring to move said carriage forward.

21. A firearm including a barrel, a stock, and cartridge-firing mechanism including a carriage movable within said stock, a spring resisting movement of said carriage in one direction, a trigger pivotally mounted on said carriage, an abutment in said stock, off-center means carried by said trigger and normally resting against said abutment, said pivotally mounted trigger being adapted to swing about said abutment as a fulcrum, whereby to shift said carriage into safety position.

22. Firing mechanism for firearms including a trigger, a carriage movable in response to the firing operation of said trigger, a firing-pin including a shoulder, means carried by said carriage and normally engaging the shoulder on said firing-pin, whereby the carriage and firing-pin are united for common movement during the firing operation of said trigger, means operable during the firing operation of said trigger for moving said shoulder-engaging means into firing-pin releasing position, and safety means adapted positively to engage said shoulder-engaging means to prevent accidental disengagement of such means from the shoulder of said firing-pin, said safety means being movable into release position to admit of the movement of said shoulder-engaging means into said firing-pin releasing position.

KENNETH P. ROLSTON.